Feb. 20, 1923.

C. A. FRODE

SHIPPING YOKE

Filed June 5, 1920

1,445,623

2 sheets-sheet 1

Inventor
C. A. FRODE

By
Attorneys

Feb. 20, 1923.
C. A. FRODE
SHIPPING YOKE
Filed June 5, 1920
1,445,623
2 sheets-sheet 2
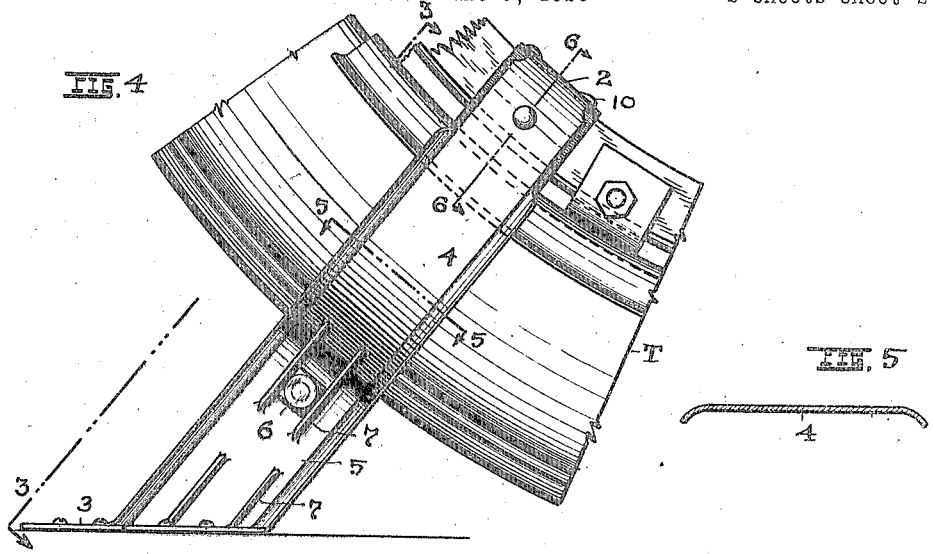
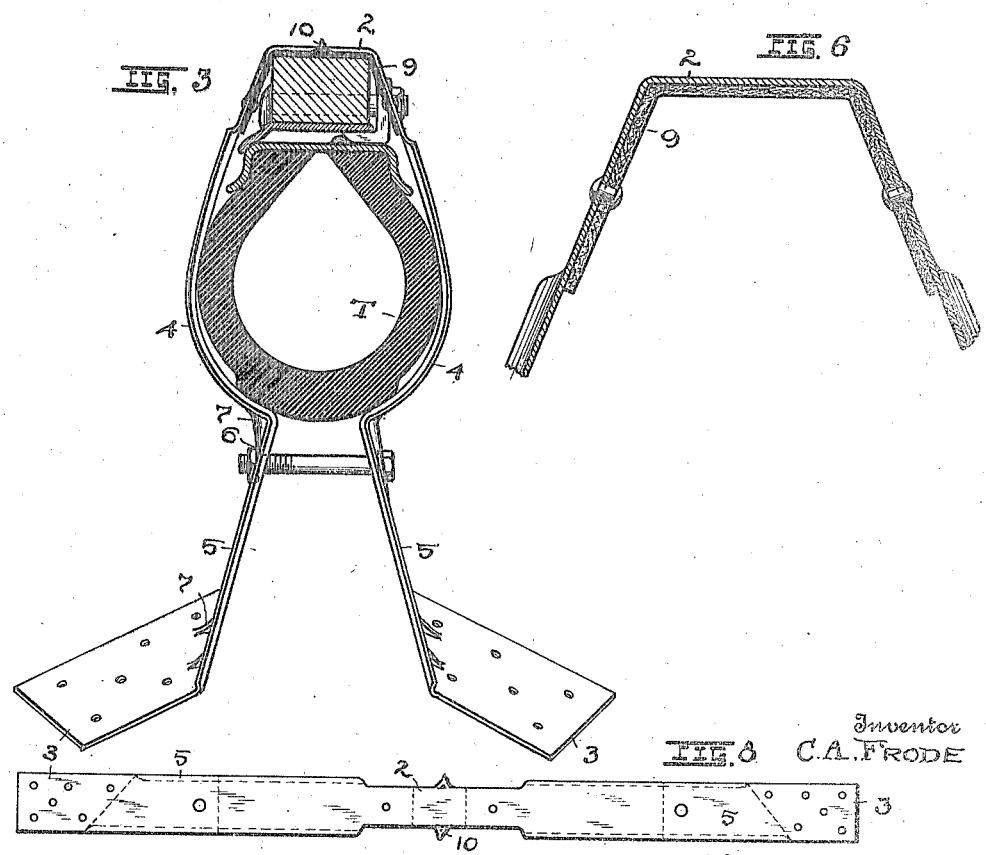
Inventor
C. A. Frode Patented Feb. 20, 1923.

1,445,623

UNITED STATES PATENT OFFICE.

CHARLES A. FRODE, OF CLEVELAND, OHIO.

SHIPPING YOKE.

Application filed June 5, 1920. Serial No. 386,844.

*To all whom it may concern:*

Be it known that I, CHARLES A. FRODE, a citizen of the United States, residing at Cleveland, in the county of Cuyahoga and State of Ohio, have invented certain new and useful Improvements in a Shipping Yoke, of which the following is a specification.

In general, the object of this invention is to provide a shipping device, consisting of a combined brace and yoke adapted to clamp and anchor an automobile for shipment in a freight car or other vehicle of conveyance. Preferably, this shipping yoke is made of a single piece of strap metal bent and pressed into a particular shape and form so that it may be easily slipped between the spokes to engage the rim and tire of an automobile wheel and so that it may be nailed temporarily to a floor in an oblique bracing position at the front or rear of the wheel, and one or a pair of such yokes may be attached to each wheel depending upon the size and weight of the automobile.

Figure 1:
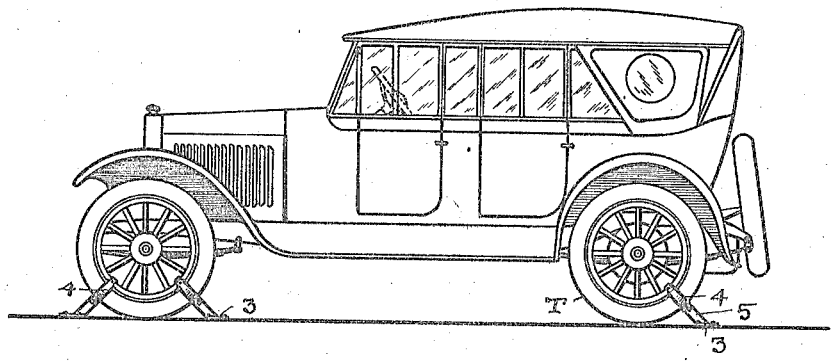
Figure 2:
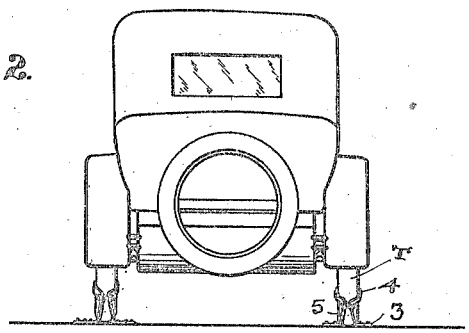
Figure 7:
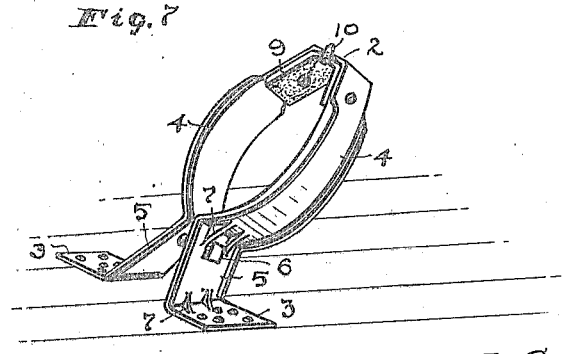

In the drawings accompanying this application, Fig. 1 is a reduced view of an automobile anchored or fixed immovably upon a base or floor by a set of my improved shipping yokes, and Fig. 2 is a rear view thereof. Fig. 3 is an enlarged top plan of the yoke engaged with a wheel and tire shown in cross section on line 3—3, Fig. 4, and Fig. 4 is a side elevation of the yoke and a portion of the wheel and tire. Fig. 5 is a cross section of the yoke on line 5—5, Fig. 4 and Fig. 6 is a section on line 6—6, Fig. 4. Fig. 7 is a reduced perspective view of the yoke and Fig. 8 is a reduced view of the flat metal strap or blank as it appears before it is bent into yoke shape.

The mode of constructing the yoke and the form and shape thereof is as follows: A flat metal strap or sheet of any suitable width and thickness is pressed and folded or doubled to provide a yoke having irregularly-shaped sides connected by a straight and narrow web or neck 2. Each side portion of the yoke has a lateral perforated extremity providing a foot 3 at its bottom and free end and the middle part 4 of each side is partly curved to confine and seat a round automobile tire T. A straight leg portion 5 is also formed beween the curved part 4 and foot 3, and this leg 5 diverges or slopes obliquely to the longitudinal median line of the yoke to brace the yoke laterally. Viewed in plan or from its top the sides of the yoke diverge on straight lines from web 2 which is preferably shaped to conform to the inner circumference of the wooden felly of an automobile wheel, and the curved part 4 is approximately two inches or more in width to produce a substantial seat for the tire. The rear and front edges of each side are also preferably rounded and turned outwardly to prevent abrasion or cutting of the rubber tire and also to strengthen and make the sides rigid. The connecting web 2 is also preferably narrower than the sides of the yoke to permit the yoke to engage the felly between the wire spokes of so-called wire wheels, it being understood that the spokes in a wire wheel are generally much closer together than spokes in a wooden wheel; and a narrow neck or web 2 is also of advantage in that the yoke may be readily spread apart or contracted to accommodate tires of different sizes, especially if heavy spring steel stock is used.

The straight leg portions of the sides have registering bolt openings and a bolt and nut 6 or other clamping means may be inserted through these openings to draw the sides together and to clamp the wheel in a seating position within the rounded portions of the yoke, and these leg portions 5 also have their opposite edges flanged or bent outwardly to give rigidity and strength to the sides, and strengthening fillets 7 may also be formed in the angles or corners where the legs unite with the curved part 4 and foot 3.

To permit the yoke to be fixed in an oblique bracing position on the floor while yoked to the wheel the straight extremities which provide feet 3 are folded at approximate right angles to the vertical sides on a straight line which extends obliquely or on a bias across the legs 5. Accordingly when the feet are nailed flat upon the floor the main body of the yoke will extend upwardly at a definite inclination and bracing angle to the wheel. This angular position of the yoke does not change when the feet are spread further apart to accommodate tires of larger size, but in spreading, the flat feet tilt upwardly in slight degree at their outer ends. However, as the stock is flexible the feet will flatten down when nailed to position. It should also be noted that the bending of the feet obliquely to the legs places the two feet in angular spreading relation or diverging position in respect to each other, viewed from above, thereby placing both the feet and legs of the yoke in a favorable bracing position relatively to the loop portion of the yoke and to the wheel.

To protect the finish on the wooden felly of the wheel I have provided the neck portion 2 of the yoke with a lining 9 of felt or cushioning material. The lining is secured within the yoke by rivets inserted through the sides at a point approximately midway between the flange of the wheel rim and the corner of the yoke where engaged with the felly and which location of the rivet places it opposite the angular space inside of the rim at each side of the felly and therefore out of contact with the felly and rim. Pointed projections 10 may also be formed at the opposite edges of the neck or web portion of the yoke wherewith to fasten the felt lining to the yoke and similar projections may be stamped out of the lining at the same point where the rivets are located and used in lieu of such rivets.

After an automobile has been placed in a freight car or other vehicle, yokes are attached to the wheels thereof as shown in Fig. 1 of the drawing and nailed to the floor to firmly hold the automobile against movements. In applying the yokes to the wheels the yoke is slipped over the felly of the wheel and adjusted to a position in which the neck portion 2 of the yoke engages the felly, the curved sides 4 engage the tire and the foot portions 3 engage the floor. The bolt 6 is then inserted and tightened to firmly clamp the wheel and to bring the feet 3 into snug engagement with the floor. Nails are then driven through the nail holes in the feet 3 into the floor to anchor the yoke.

What I claim is:

1. An article of manufacture and sale adapted to anchor automobiles for shipment, comprising a yoke with curved sides and open at its bottom and legs having perforated extremities adapted to fasten said yoke in oblique bracing position upon a base and in clamping relations upon an automobile wheel.

2. An article of manufacture and sale adapted to anchor automobiles for shipment, comprising a unitary yoke having a connecting web adapted to engage over the inside of the rim of an automobile wheel and embodying curved side portions adapted to embrace and seat the rubber tire of said wheel and provided with legs having perforated feet adapted to be fixed to a floor.

3. An article of manufacture and sale adapted to anchor automobiles for shipment, comprising a yoke adapted to embrace the rim and tire of an automobile wheel and having diverging leg portions and lateral feet adapted to fix said article to a base in bracing relation laterally and longitudinally in respect to said wheel.

4. A shipping yoke for automobiles, comprising a metal strap folded and formed at its middle portion to engage about and form a seat for the rim and tire of an automobile wheel and provided with angular extremities disposed obliquely to the sides of said member and adapted to seat said member in bracing position to said wheel.

5. A shipping device comprising legs and a yoke adapted to clamp and anchor an automobile wheel to a floor and said yoke flexible and adapting the sides thereof to be spread laterally to confine and clamp different sized tires in seating position therein and said legs connected beneath said yoke.

6. A device adapted to clamp and anchor an automobile for shipment, comprising a yoke having curved side portions with a connecting web and adapted to engage a wheel tire and rim in seating and confining relations and provided with diverging legs and lateral feet adapted to support said yoke in an inclined bracing position upon a floor and relatively to the wheel.

7. A shipping yoke for automobiles having an integral connecting web and leg portions with curved seats terminating in said web and perforated feet for said leg portions.

8. A shipping yoke for automobiles, having a bow portion provided with a lining of soft material and curved seating portions at its sides adapted to seat a wheel tire.

9. A shipping device, comprising a metal yoke having curved sides terminating in flat extensions and united by a straight web, and a protecting lining for the wheel secured upon the inside of said yoke at said web.

10. A combined brace and yoke adapted to clamp and anchor an automobile for shipment, comprising a single piece of metal folded and doubled and curved in part to seat the tire of a wheel and bent at its extremities on a line obliquely to the line extending longitudinally of the main body of the yoke to provide a base portion adapted to support said yoke in an inclined position upon a floor, in combination with means adapted to clamp the bolted portions of the yoke together where curved.

Signed at Cleveland, in the county of Cuyahoga, and State of Ohio, this 1st day of June, 1920.

CHARLES A. FRODE.